United States Patent [19]

Kays et al.

[11] Patent Number: 6,050,358
[45] Date of Patent: Apr. 18, 2000

[54] DUAL PIVOT SWING-OUT ENGINE TRAY

[75] Inventors: Brian J. Kays, Issaquah; Michael F. Davis, Seattle; John Busuttil, Redmond, all of Wash.

[73] Assignee: Genie Industries, Inc., Redmond, Wash.

[21] Appl. No.: 09/102,536

[22] Filed: Jun. 22, 1998

[51] Int. Cl.[7] .................................................. B60K 1/00
[52] U.S. Cl. .......................... 180/294; 16/358; 180/298
[58] Field of Search .................... 16/357, 358, 360, 16/361; 180/299, 291, 294, 298

[56] References Cited

U.S. PATENT DOCUMENTS

| | | |
|---|---|---|
| 2,206,499 | 7/1940 | Dumelin . |
| 2,867,839 | 1/1959 | Squire . |
| 3,001,225 | 9/1961 | Squire .................................. 16/358 X |
| 4,770,427 | 9/1988 | Howell et al. . |
| 4,831,966 | 5/1989 | Tutelian ............................... 16/358 X |
| 5,137,108 | 8/1992 | Knowlton et al. . |
| 5,346,034 | 9/1994 | Knowlton et al. . |
| 5,419,131 | 5/1995 | Doppstadt . |

*Primary Examiner*—Michael Mar
*Attorney, Agent, or Firm*—Perkins Coie LLP

[57] ABSTRACT

A scissors lift (20) including an engine compartment (22) having an engine (24) therein. An engine mount (25) which permits rotation of the engine (24) outward about two pivot axes and out of the engine compartment (22) so that items on the back side of the engine such as the oil filter, alternator, or starter can be accessed. The engine (24) begins in a first position, is rotated about a first axis (68) to a second position, and is rotated outward about a second axis (70) to a third position.

11 Claims, 12 Drawing Sheets

DUAL PIVOT SWING-OUT ENGINE TRAY

FIELD OF THE INVENTION

This invention is directed to a swing-out engine tray and, more particularly, a swing-out engine tray that is pulled outward and rotated about two separate pivot axes.

BACKGROUND OF THE INVENTION

Industrial-type vehicles, or vehicles used in an industrial environment, are subject to very hard, continuous, and often abusive use. As a consequence, the vehicles are often more in need of maintenance than many other types of equipment. Thus, it is advantageous for such vehicles that the engine be easily accessible so that a maintenance worker can access virtually all parts of the engine and other components of the industrial vehicle.

The prior art has taught swing-out mounting arrangements for engines whereby the engine and accessories are rotated outward from the vehicle into a more accessible position for maintenance. For example, Knowlton et al., (U.S. Pat. No. 5,346,034) discloses a sweeper vehicle having an engine mounting arrangement that permits the engine and most of its accessories to be pivoted out of the engine compartment to a position in which there is ready access to the rear side of the engine and its accessories, thereby facilitating inspection, cleaning, and maintenance of the engine. In the vehicle engine mounting system in Knowlton et al., the engine is rotated outward about one vertical axis. Thus, items on the engine adjacent the pivot axis such as the radiator, are not rotated outward, but remain within the engine compartment during rotation of the engine. There is a need for a more convenient manner of accessing an engine within a compartment so that all parts of the engine can be easily accessed for maintenance, cleaning, or inspection.

Other prior art engine mounts also utilize a single vertical axis about which an engine mount is rotated. For example, U.S. Pat. No. 5,419,131 to Doppstadt discloses a power unit mounted at a support frame that is pivotably mounted about a single pivot axis for ease of service and maintenance. Similarly, U.S. Pat. No. 4,770,427 to Howell et al. discloses an aircraft loader having an engine mounted on a frame that is pivotally mounted about a single axis for service. Howell et al. solves the problem of access to the portion of the engine adjacent to the pivot axis by providing a shrouding that extends across one side of the engine and across the rear. Removing the shrouding allows access to the portion of the engine adjacent the pivot axis. Although the removable shrouding is a convenient manner of providing access to additional portions of the engine, at least a portion of the engine remains within the enclosure. Moreover, this solution is not available for an engine which is mounted in the center of an industrial vehicle.

In summary, the prior art does not disclose a manner in which an engine can be rotated outward from an enclosure and in which the portion of the engine adjacent to the pivot axis can be easily accessed. There is a need for an engine mount which solves these problems.

SUMMARY OF THE INVENTION

The present invention provides an engine mount for a vehicle chassis. The engine mount includes a base, an engine support and first and second pivot axes on the base that are removed from one another. The engine support is connected to the base such that the engine support is capable of rotating outward relative to the vehicle chassis about both the first pivot axis and the second pivot axis.

In accordance with one aspect of the invention, a slide block is connected to the engine support and is adapted to slide along the base when the engine support is rotated outward. A second slide block can also be provided that is connected to the base, and is arranged such that the engine support engages and slides along the slide block when the engine support is rotated outward.

The first pivot axis in one embodiment includes a first pin attached to one of the engine support and the base. The first pin is adapted to engage a first arcuate guideway on the other of the engine support and the base. The second pivot axis can have a similar structure, such that it includes a second pin attached to one of the engine support and the base, and adapted to engage a second arcuate guideway on the other of the engine support and the base.

Preferably, the first arcuate guideway and the second actuate guideway are located on a first of the engine support and the base, and the first arcuate guideway defines a radius that revolves about a point along the second arcuate guideway. Likewise, the second arcuate guideway preferably defines a radius that revolves about a point along the first arcuate guideway.

The present invention also provides an engine mount for a vehicle chassis, having a base and an engine support for holding an engine. First and second cam followers are fixed to one of the engine support and the base. First and second arc-shaped cam guides are fixed on the other of the engine support and the base. The first cam follower is configured to engage the first cam guide, and the second cam follower is configured to engage the second cam guide. The cam followers and the cam guides are arranged such that the engine support can move outward in a first movement in which the engine support rotates about the first cam follower and the second cam follower moves along the second arc-shaped cam guide, and a second movement in which the engine support rotates about the second cam follower and the first cam follower moves along the second arc-shaped cam guide.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
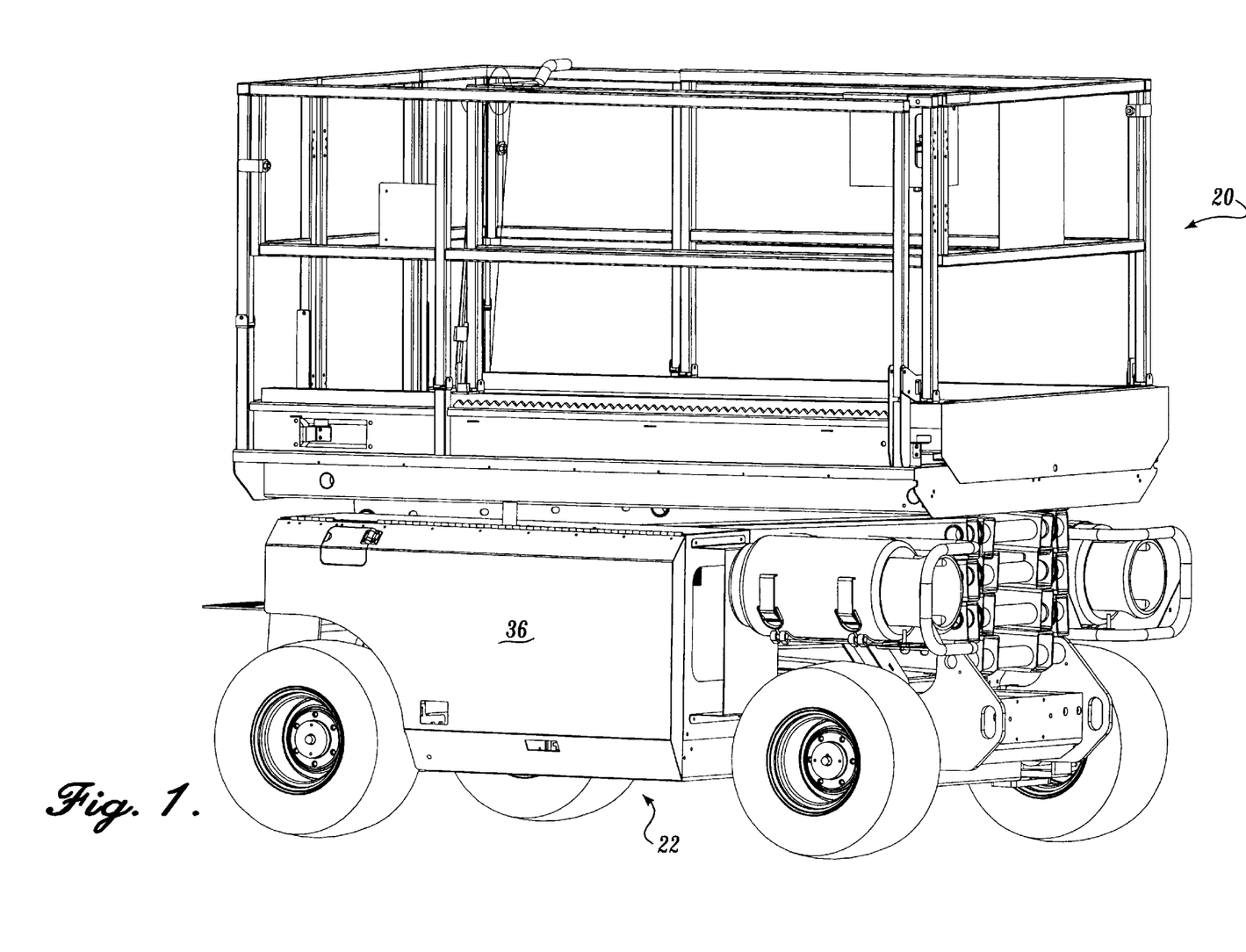
FIG. 1 is a side perspective view of a scissors lift incorporating the engine mount of the present invention.

Referring now to the drawing, in which like reference numerals represent like parts throughout the several views, FIG. 1 shows a scissors lift 20 embodying the present invention. The scissors lift 20 includes an engine compartment 22 having an engine 24 therein. Briefly described, the present invention provides an engine mount 25 which permits rotation of the engine 24 outward about two pivot axes and out of the engine compartment 22 so that items on the back side of the engine such as the oil filter, alternator, or starter can be accessed. The engine 24 begins in the position shown in FIG. 2, is rotated about a first axis to the position in FIG. 3, and is rotated outward about a second axis to the position in FIG. 4.

Figure 2:
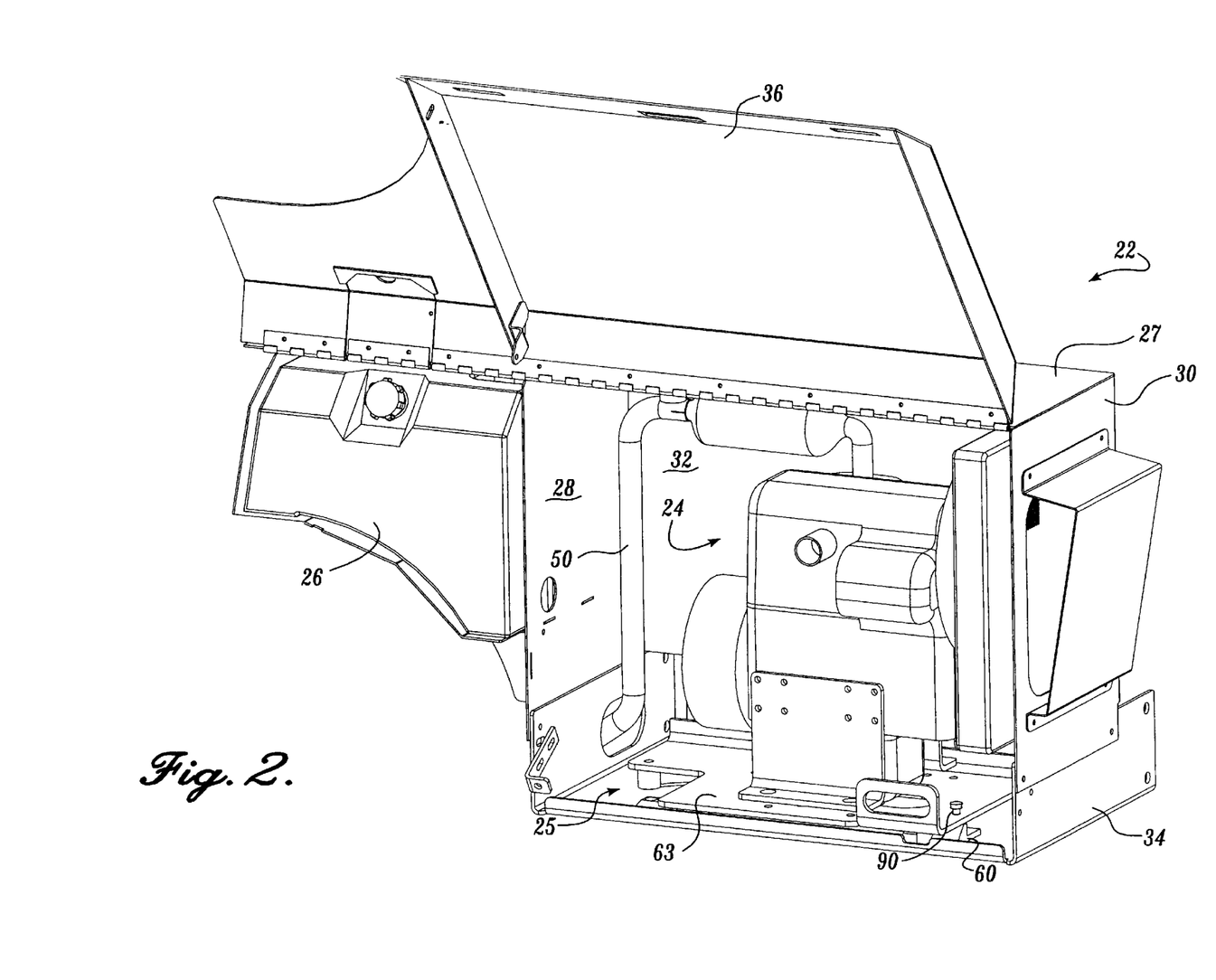
FIG. 2 is a side perspective view of the engine compartment and engine mount for the scissors lift of FIG. 1.

Referring now to FIG. 2, the engine compartment 22 includes a gas tank 26 on one side, and is closed on five sides by a top 27, left wall 28, right wall 30, rear wall 32, and a stationary bottom tray 34. A hinged door 36 closes the sixth side of the engine compartment 22 and completes the enclosure around the engine 24.

The stationary bottom tray 34 acts as a base for the engine mount 25. As can best be seen in FIG. 5, the stationary bottom tray 34 includes a lower pan 40 having a front rolled lip 41. Left and right panels 42, 44 extend upward from the outer edges of the lower pan 40 and are attached to the bottom edges of the left and right walls 28, 30 of the engine compartment 22. A rear panel 46 extends upward from the rear edge of the lower pan 40. The stationary bottom tray 34 includes a number of holes 48 through which engine lines 50 (FIG. 2) extend.

Figure 5:
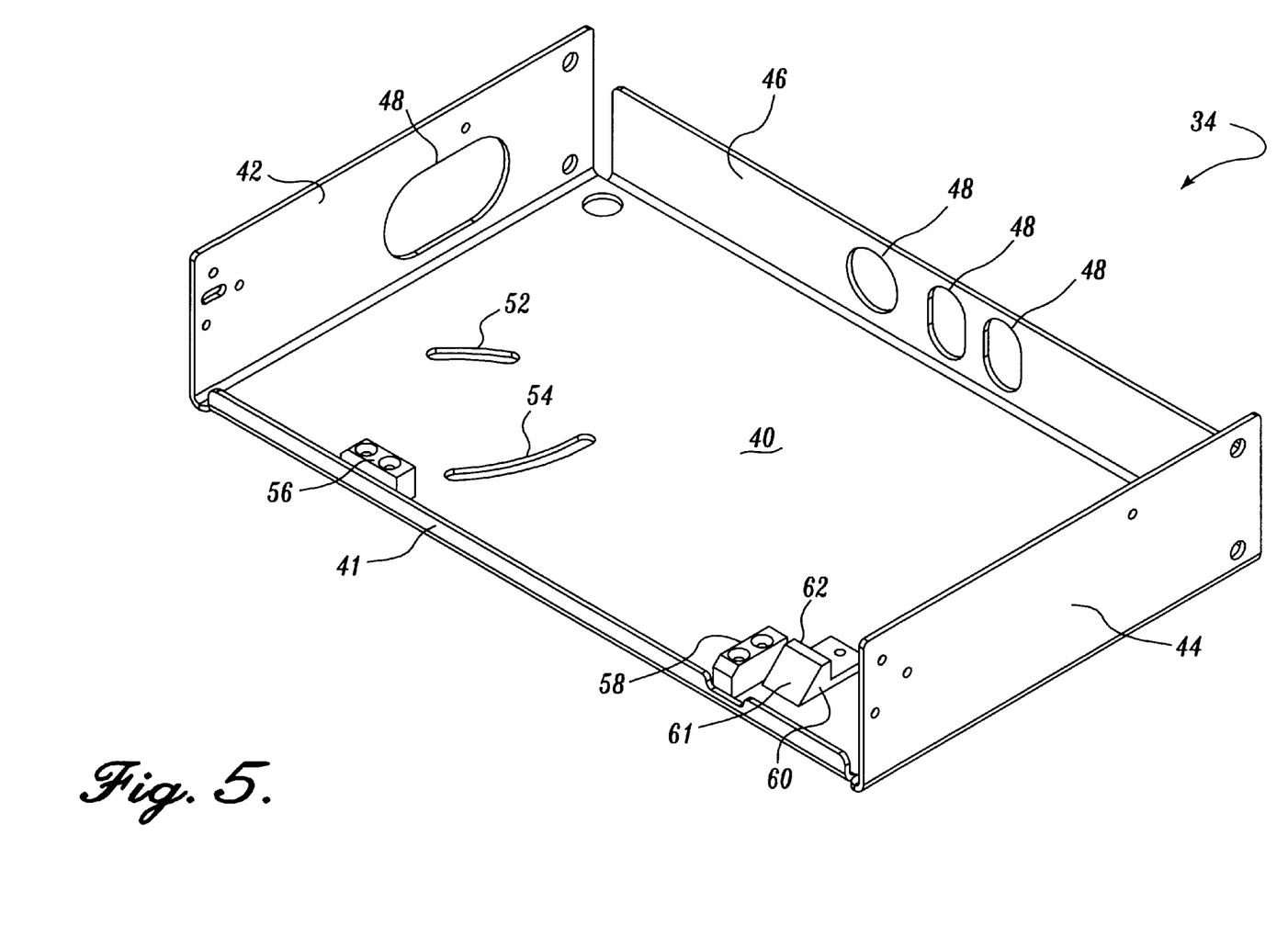
FIG. 5 is a side perspective view of the stationary tray for the bottom of the engine compartment of FIG. 2.
Figure 6:
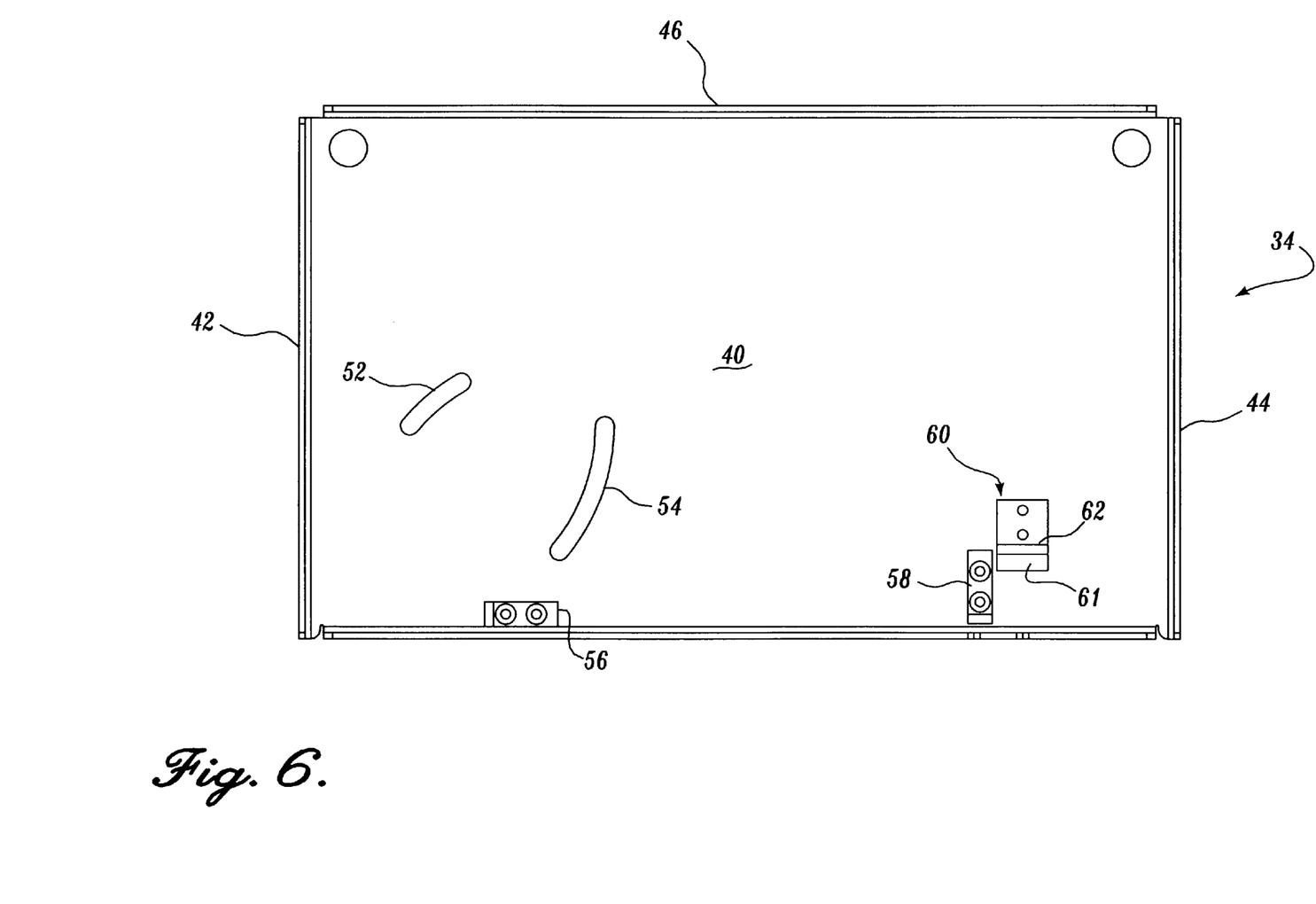
FIG. 6 is a top view of the stationary tray of FIG. 5.

At the forward, left side of the lower pan 40 is located a first elongate arcuate slot 52 and a second elongate arcuate slot 54. The function of the elongate arcuate slots 52, 54 is described in detail below.

Located along the forward end of the lower pan 40, adjacent to the front rolled lip 41 is a first slide block 56. The first slide block 56 is preferably rectangular in cross-section. A second slide block 58 of similar shape is located at the opposite end of the lower pan 40, adjacent to the front rolled lip 41, but extending perpendicular thereto. The first and second slide blocks 56, 58 are preferably formed of a low friction material, such as a phenolic.

A lock plate 60 is located adjacent to the second slide block 58. The lock plate 60 includes a slanted forward surface 61 and a rearward abutment surface 62.

Figure 3:
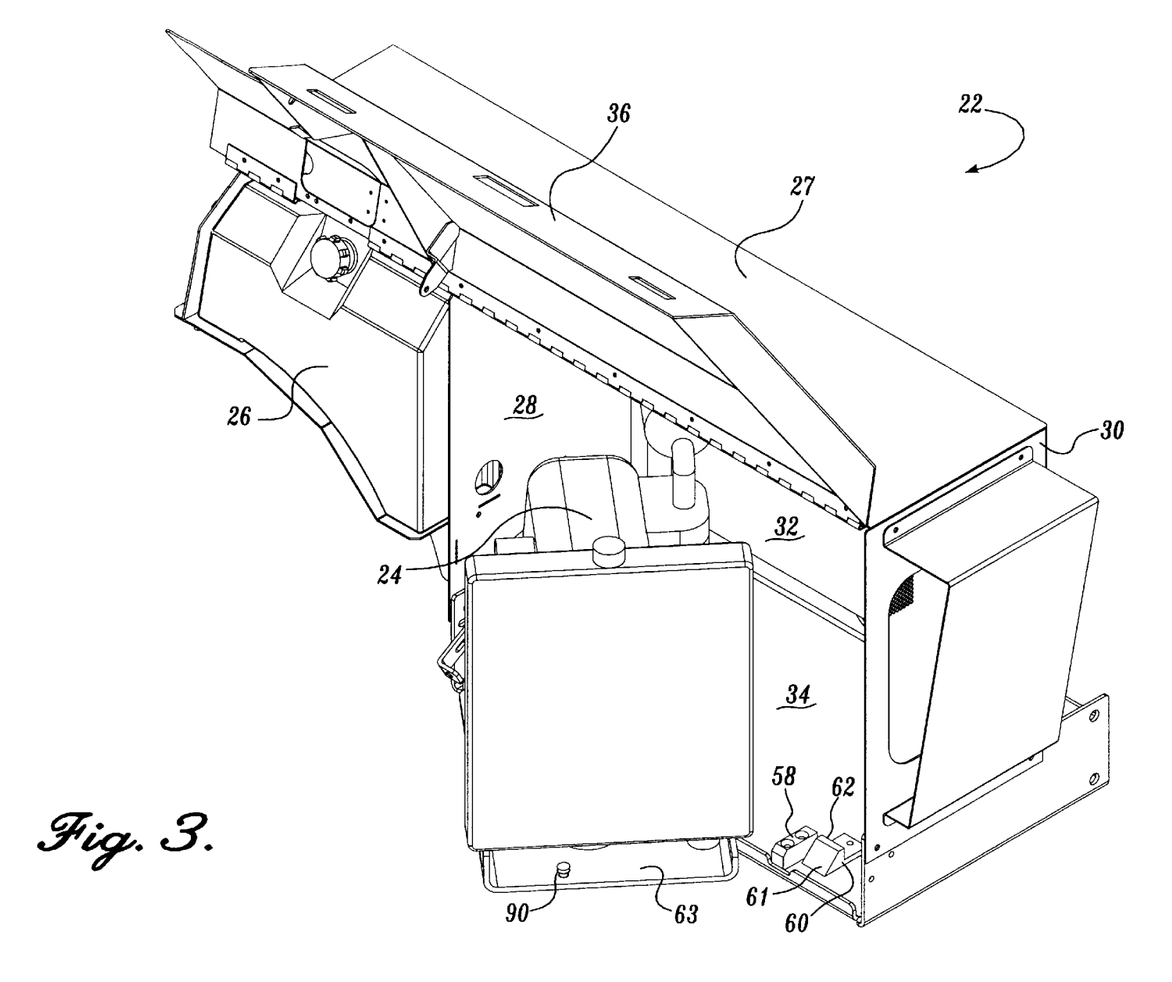
FIG. 3 is a side perspective view of the engine compartment of FIG. 2, with the engine partly rotated out of the engine compartment.
Figure 4:
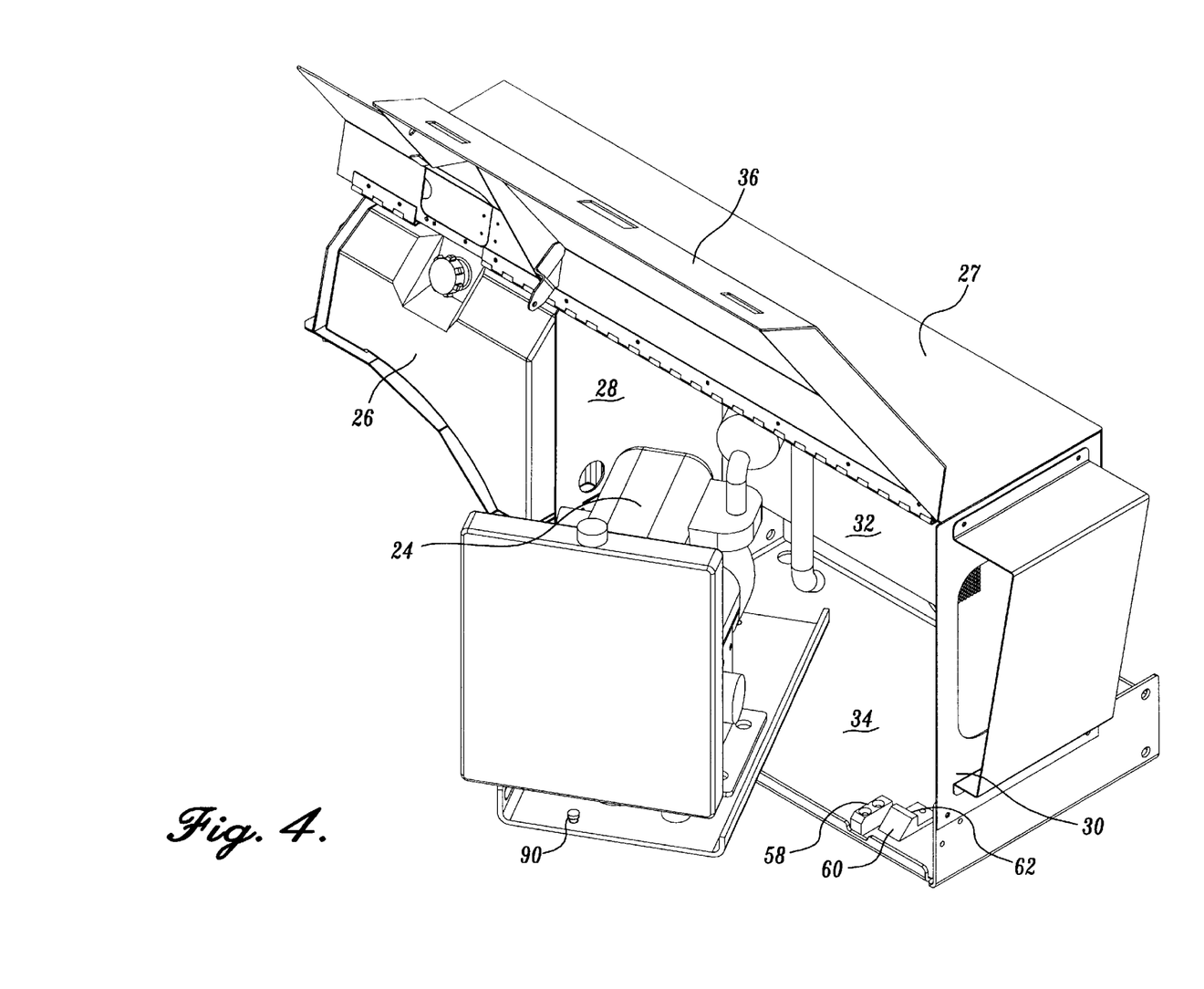
FIG. 4 is a side perspective view of the engine compartment of FIG. 2, with the engine fully rotated out of the engine compartment.

The engine mount 25 includes an engine support, or tray 63 (FIG. 7) upon which the engine is mounted. The engine tray 63 slides outward with the engine 24, as can be seen in FIGS. 3 and 4. The engine tray 63 includes a hole 64 through which lower portions of the engine 24 can be accessed when the engine tray 63 is pulled outward.

Figure 7:
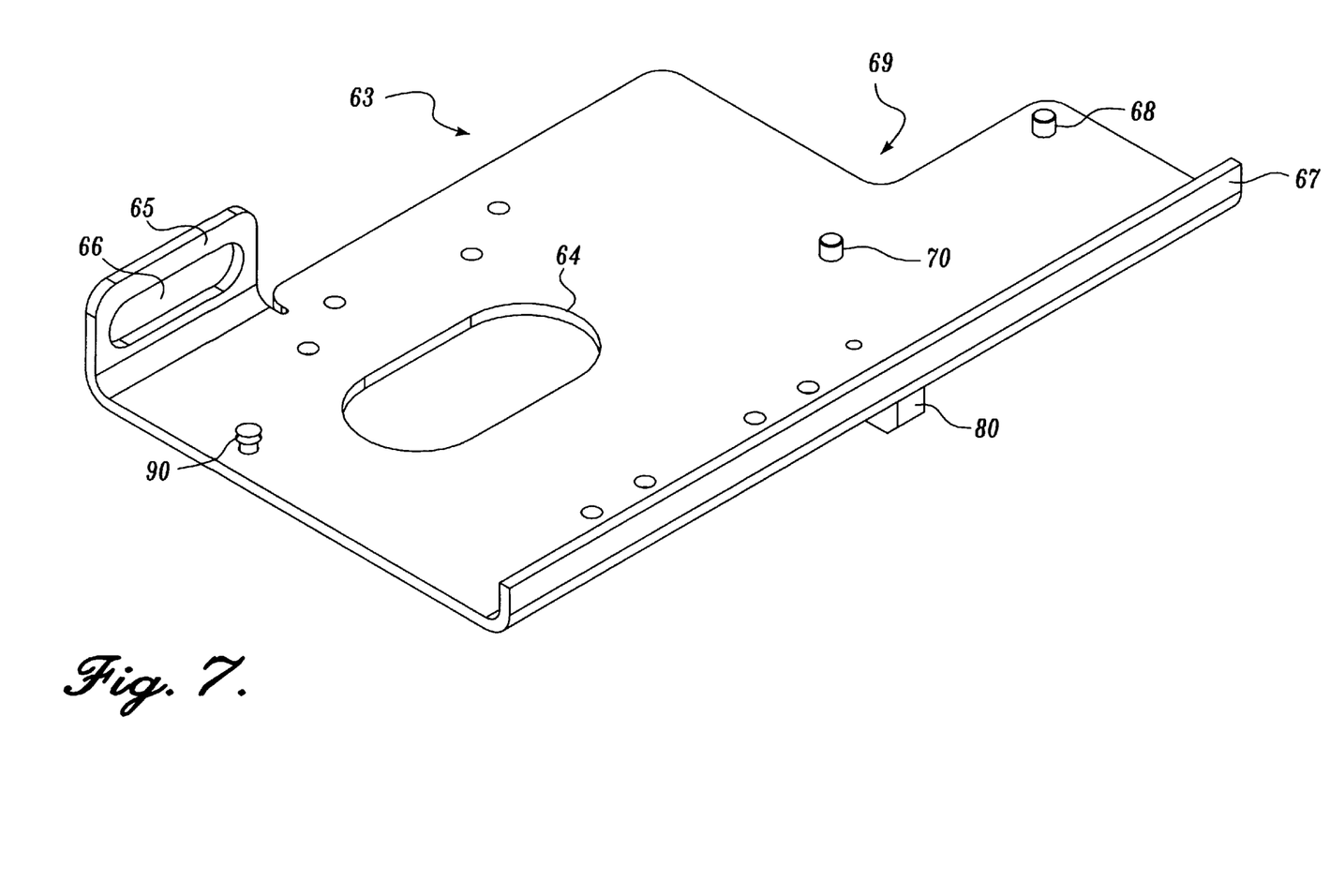
FIG. 7 is a rear, side perspective view of the engine tray for the engine mount of FIG. 2.

A handle 65 is located at the forward, right edge of the engine tray 63. The handle extends perpendicularly upward from the plane of the engine tray 63 so that it is easily accessible. In practice, the handle 65 is gripped by a maintenance worker and the maintenance worker pulls the engine tray 63 and engine 24 outward. The handle 65 includes a fingers hole 66 through which the maintenance worker's fingers extend when gripping the handle 65.

The engine tray 63 is substantially rectangular in shape, but includes a rectangular cutout 69 at the forward, left portion of the engine tray to prevent interference between the engine tray and the engine compartment 22 when the engine tray is swung outward. The engine tray 63 includes a rear flange 67 that extends along the rearward portion of the engine tray and upward so as to form a perpendicular wall at the rear end of the engine tray.

Figure 8:
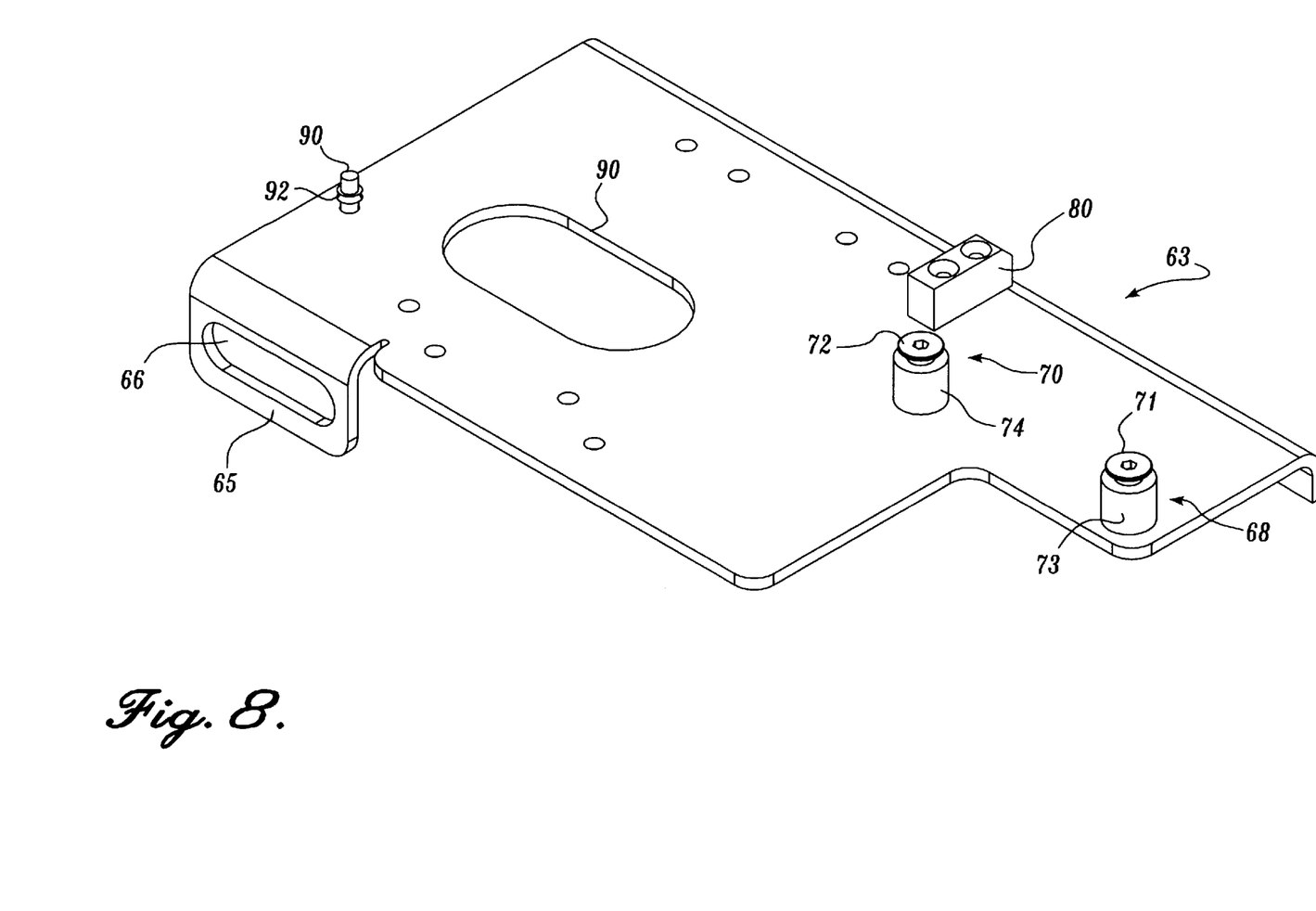
FIG. 8 is a bottom, front perspective view of the engine tray of FIG. 7.

As can best be seen in FIG. 8, the engine tray 63 includes first and second pins 68, 70 extending perpendicular to the plane of the engine tray and rearward out of the bottom of the engine tray. Each of the pins 68, 70 includes shoulder bolts 71, 72 extending through collars 73, 74. The collars 73, 74 are preferably formed of a low-friction material, such as a phenolic.

A slide block 80, similar in construction and material make-up to the slide blocks 56, 58, is located on the underside of the engine tray 63 adjacent and opposite the rear flange 67, and extending perpendicular thereto. The slide block 80 is preferably the same height as the slide blocks 56, 58, and the collars 73, 74.

Figure 9:
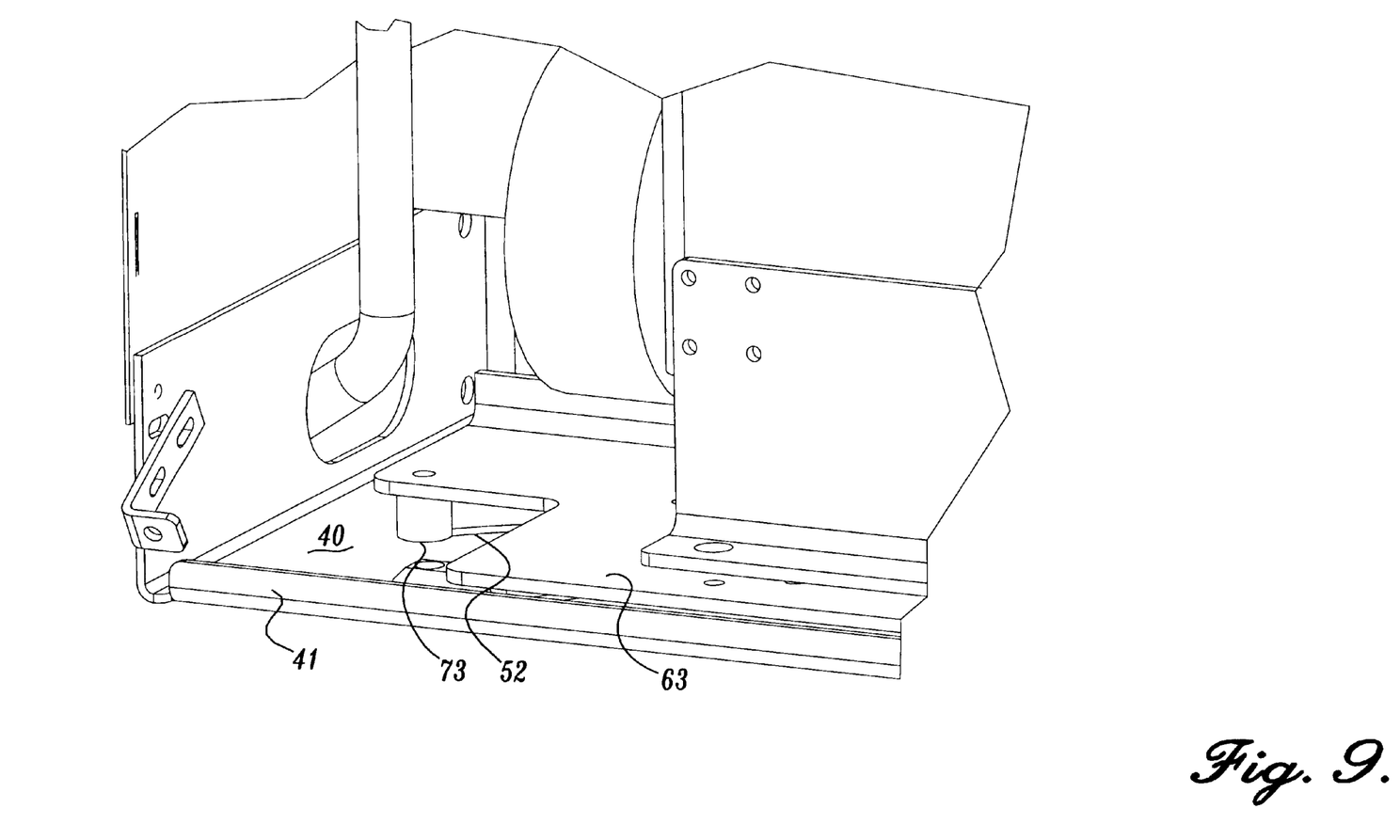
FIG. 9 is a detail view showing attachment of the engine tray of FIG. 7 to the stationary tray of FIG. 5.

As can be seen in FIG. 9, the first pin 68 extends through the first elongate arcuate slot 52. The first pin 68 extends from the engine tray 63, downward through the collar 73, and through the first elongate arcuate slot 52. The flange of the shoulder bolt 71 extends on the opposite side of the lower pan 40 from the collar 73. The shoulder bolt 71 can include a washer made of low-friction material (not shown) that engages the lower side of the pan 40. The shoulder bolt 71 and the pin 68 are preferably tight enough so as to prevent movement of the collar and the shoulder bolt relative to the lower pan 40, but loose enough so that the first pin 68 can slide along the first elongate arcuate slot 52, with the collar 73 and the shoulder bolt 71 sliding along the upper and lower surfaces of the lower pan 40, respectively. The second pin 70, the collar 74, and the shoulder bolt 72 are connected to the second elongate arcuate slot 54 in a similar manner.

Figure 10:
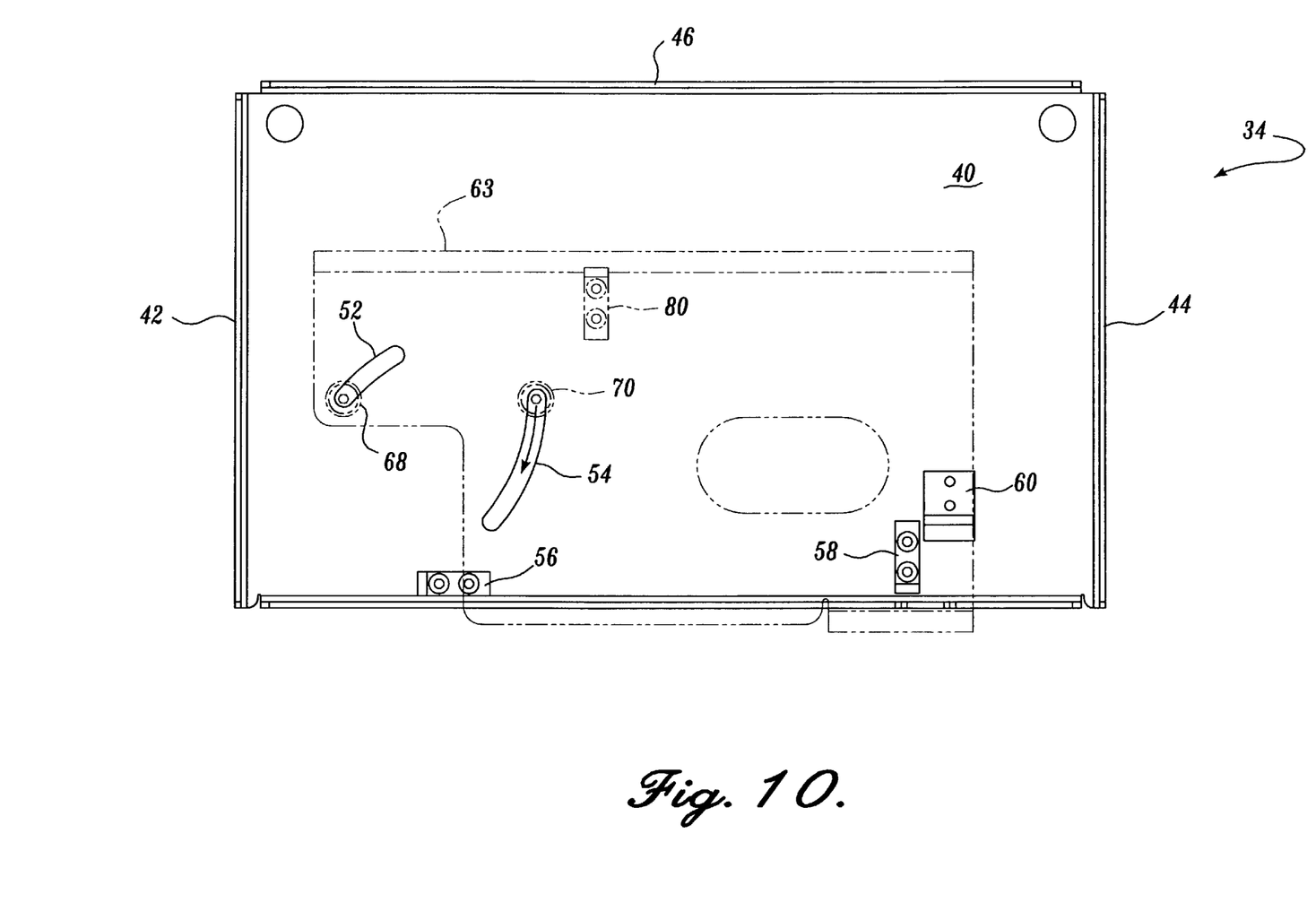
FIG. 10 is a top plan view similar to FIG. 6, showing the mounting pins for the engine tray extending through the slots of the stationary tray, with the engine tray beginning rotation outward toward the position shown in FIG. 3.

The operation of the engine mount 25 will now be described. Referring to FIG. 10, when the engine 24 is in the stored position (FIG. 2), the first pin 68 is located at the front edge of the first elongate arcuate slot 52. The second pin 70 is located at the rear edge of the second elongate arcuate slot 54. The second elongate arcuate slot 54 is configured and arranged such that it has a radius which revolves about the rotational central axis of the first pin 68 when the first pin is in this forward position. To move the engine tray 63 outward, a maintenance worker grips the handle 65 and pulls outward on the engine tray 63. During this movement, the engine tray 63 rotates about the first pin 68 and the second pin 70 moves as indicated by the arrow in FIG. 10 along the second elongate arcuate slot 54. In this manner, the second elongate arcuate slot 54 acts as a guideway for the second pin 70. Rotation continues around the first pin 68 until the second pin 70 engages the end of the second elongate arcuate slot 54 (FIG. 11).

Figure 11:
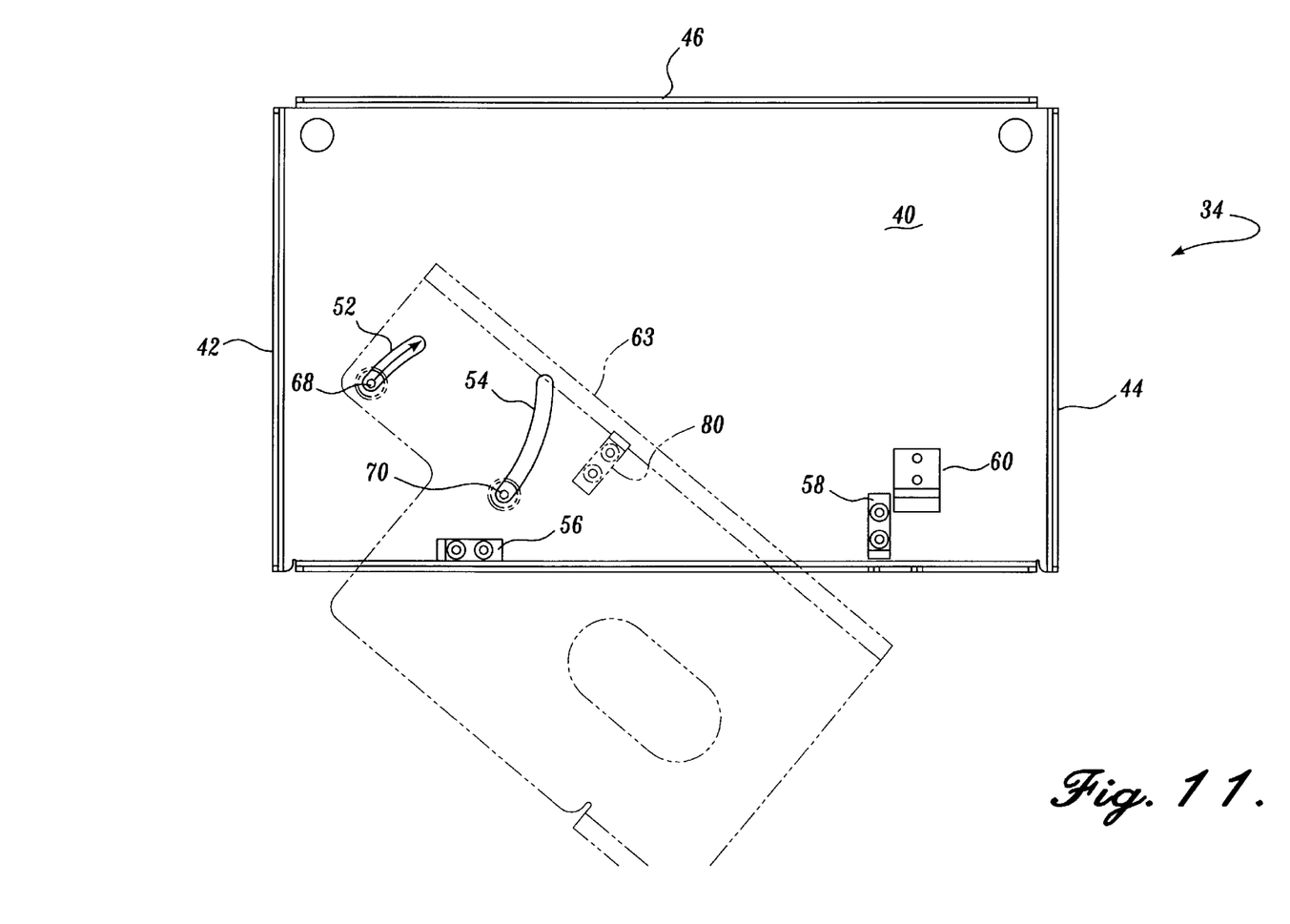
FIG. 11 is a top plan view similar to FIGS. 6 and 10, with the engine tray in the position of FIG. 3, and beginning rotation outward toward the position shown in FIG. 4.
Figure 12:
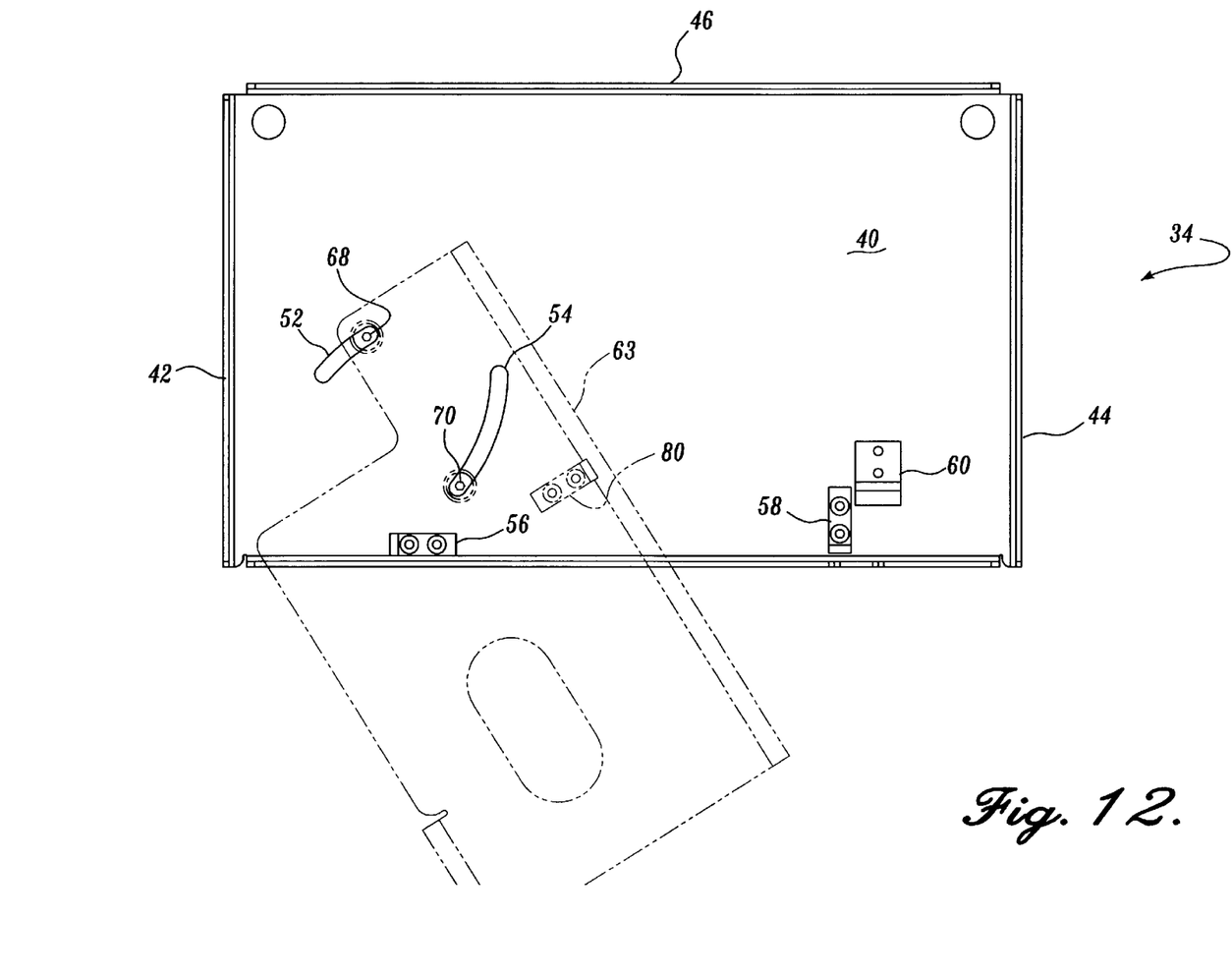
FIG. 12 is a top plan view similar to FIGS. 10 and 11, with the engine tray in the position of FIG. 4.

The first elongate arcuate slot 52 is configured and arranged such that it has a radius which revolves about the rotational axis of the second pin 70 when it is in the location shown in FIG. 11. Thus, if a maintenance worker continues to pull the engine tray 63 outward from the position in FIG. 3, the engine tray 63 rotates about the second pin 70 and the first pin 68 moves along the first elongate arcuate slot 52 as indicated by the arrow in FIG. 11. In this manner, the engine tray 63 and the engine 24 are rotated outward to the position shown in FIGS. 4 and 12.

At the initial storage position shown in FIG. 2, the engine tray 63 is supported by the collars 73, 74, by the engine tray resting against the top of the slide blocks 56, 58, and by the slide block 80 on the engine tray 63 engaging the lower pan 40 on the stationary bottom tray 34. The slide blocks 56, 58, 80 and the collars 73, 74 are all preferably of a length that extends from the engine tray 63 to the stationary tray 34. Thus, each of these members serve to support some of the weight of the engine 24 and the engine tray. Because the slide blocks 56, 58, and 80 and the collars 73, 74, are made of a low-friction material, these items slide along either the engine tray 63 or the lower pan 40 during movement outward of the engine tray and the engine 24. The slide blocks 56, 58, and 80 also serve to prevent bending movements about the first and second pins 68, 70, thus relieving strain and permitting free rotation of the engine tray 63 about the first and second pins 68, 70.

A lock is provided so as to prevent accidental extension of the engine tray 63. In the engine mount 25 shown in the drawings, a spring biased bolt 90 (FIGS. 7 and 8) is mounted through the engine tray 63. The spring biased bolt 90 is located in a position such that the bottom edge of the bolt engages and slides over the slanted forward surface 61 of the lock plate 60 when the engine tray is pressed to the storage position. The top of the bolt 90 may be pulled upward against the tension of a spring 92 (FIG. 8) so as to lift the bottom of the bolt above the level of the stop surface 62 for the lock plate 60. In this manner, the engine tray 63 can be pulled outward and the spring biased bolt 90 does not engage the stop surface 62. When the engine tray 63 is pressed back into place, the bolt 90 engages and slides over the sliding surface 61 of the lock plate 60 and then pops back into place against the stop surface 62. In this manner, the engine tray 63 is held in place so as to prevent accidental extension of the engine tray 63.

The engine mount 25 of the present invention provides a number of benefits over prior art engine mounts. By providing the dual pivot axes-slot arrangement in which the engine rotates about one pivot axis and then pivots about a second axis, the engine mount 25 provides better access to the rear components of the engine 24 and requires less space within the engine compartment 22. Thus, the engine 24 can be mounted in a smaller engine compartment 22, but all parts of the engine can be accessed for maintenance, cleaning, and inspection. The slide blocks 56, 58, and 80 carry the bulk of the weight of the engine 24, thus preventing bending moments around the pivot axes and smooth movement of the engine tray 63 outward.

While the preferred embodiment of the invention has been illustrated and described with reference to preferred embodiments thereof it will be appreciated that various changes can be made therein without departing from the spirit and scope of the invention as defined in the appended claims.

The embodiments of the invention in which an exclusive property or privilege is claimed are defined as follows:

1. An engine mount for a vehicle having an engine compartment, comprising:

a base plate located within the engine compartment;

an engine support plate mounted within the engine compartment and positioned above the base plate for holding an engine mounted thereon;

first and second cam followers attached to one of the engine support plate and the base plate;

first and second arc-shaped cam guides formed in the other one of the engine support plate and the base plate, the first cam follower configured to engage the first cam guide, and the second cam follower configured to engage the second cam guide, the cam followers and the cam guides being arranged such that the engine support plate can move outwardly of the engine compartment in a first range of pivotal movement in which the engine support plate pivots about the first cam follower while the second cam follower moves along the second arc-shaped cam guide, and a second age of pivotal movement in which the engine support plate pivots about the second cam follower while the first cam follower moves along the first arc-shaped cam guide; and at least one support member securely attached to one of the base plate and the engine support plate for moveable engagement with the other one of the base plate and the engine support plate when the engine support plate is pivoted relative to the base plate.

2. The engine mount of claim 1, wherein the cam guides are mounted on the engine support plate.

3. The engine mount of claim 1, where the cam followers are pins.

4. The engine mount of claim 1, wherein the support member is a slide block connected to the engine support plate and adapted to slide along the base plate when the engine is pivoted outwardly from the engine compartment.

5. The engine mount of claim of 4, wherein the support member is a slide block connected to the base plate, and arranged such that the engine support engages and slides along the slide block when the engine support is pivoted outwardly from the engine compartment.

6. The engine mount of claim 1, wherein the support member is a side assembly for supporting the engine support plate and permitting slideable movement of the engine support plate relative to the base plate.

7. The engine mount of claim 1, wherein the first cam guide and the second cam guide are located on a first of the engine support plate and the base plate, and wherein the first cam guide defines a radius that revolves about a point along the second cam guide.

8. The engine mount of claim 7, wherein the point along the second cam guide is adjacent the end of the second cam guide.

9. The engine mount of claim 7, wherein the second cam guide defines a radius that revolves about a point along the first cam guide.

10. The engine mount of claim 9, wherein the point along the first cam guide is adjacent the end of the first cam guide.

11. The engine mount of claim 1, wherein the support member is a slide assembly for supporting the engine support plate and permitting slideable movement of the engine support plate relative to the base plate.

* * * * *